United States Patent [19]

Leuschner et al.

[11] Patent Number: 4,473,002

[45] Date of Patent: Sep. 25, 1984

[54] ELECTRIC COFFEE MACHINE WITH A CENTRIFUGAL FILTER

[75] Inventors: Udo Leuschner, Traunwalchen; Alfons Zinsberger, Laufen; Alfons Reitmeier, Burgkirchen, all of Fed. Rep. of Germany

[73] Assignee: Bosch-Siemens Hausgeraete GmbH, Stuttgart, Fed. Rep. of Germany

[21] Appl. No.: 421,021

[22] Filed: Sep. 21, 1982

[30] Foreign Application Priority Data

Sep. 22, 1981 [DE] Fed. Rep. of Germany ....... 3137703
Sep. 22, 1981 [DE] Fed. Rep. of Germany ....... 8127734
Feb. 8, 1982 [DE] Fed. Rep. of Germany ....... 3204255

[51] Int. Cl.³ ............................................. A47J 31/22
[52] U.S. Cl. .................................................. 99/302 C
[58] Field of Search ..................... 99/287, 302 C, 279, 99/300; 494/82; 426/433

[56] References Cited

U.S. PATENT DOCUMENTS 3,128,691 4/1964 Carrillo ............................. 99/302 C
3,344,733 10/1967 Herrera ............................. 99/302 R Primary Examiner—Robert W. Jenkins
Attorney, Agent, or Firm—Herbert L. Lerner; Laurence A. Greenberg

[57] ABSTRACT

Coffee machine with a centrifugal filter releasably coupled suring operation with a motor shaft and receiving brewing water via a transporter disposed thereon and rotatable therewith including a plurality of transport channels for brewing water distributed around the periphery of the transporter.

21 Claims, 3 Drawing Figures

ELECTRIC COFFEE MACHINE WITH A CENTRIFUGAL FILTER

The invention relates to a coffee machine with a centrifugal filter releasably coupled during operation with a motor shaft and receiving brewing water, via a transporter disposed thereon, out of a heated water bowl disposed under the transporter.

In this type of coffee machine wherein the transporter and the centrifugal filter rotate together without relative movement with respect to one another, the problem exists that the transporter sprays the brewing water non-uniformly upon the ground coffee ring forming in the coffee filter, resulting thereby in imbalance and non-uniform consumption of the ground coffee. Furthermore, the problem arises of avoiding imbalance, centering the centrifugal filter together with the transporter suitably relative to the motor shaft without requiring the centering devices to have all too-narrow and thereby costly manufacturing tolerances.

It is accordingly an object of the invention to provide an electric coffee machine with a centrifugal filter of the foregoing type, wherein imbalance is avoided, brewing water is fed uniformly distributed to the ground coffee, and the coffee is uniformly consumed or used.

With the foregoing and other objects in view, there is provided in accordance with the invention, a coffee machine with a centrifugal filter releasably coupled during operation with a motor shaft and receiving brewing water via a transporter disposed thereon and rotatable therewith comprising a plurality of transport channels for brewing water distributed around the periphery of the transporter.

In accordance with another feature of the invention, the transporter is formed with ribs defining the transport channels, the ribs being distributed around the periphery of the transporter and extending substantially vertically and helically, respectively at least in an upper part of the transporter. The brewing water entering these channels is fed thus, respectively, to a given region of the discharge opening or openings for spraying the coffee grains and uniformly contacts the ground coffee distributed around the periphery. In accordance with a further feature of the invention, the ribs extend over substantially the entire height of the transporter up to the discharge or delivery opening or openings.

In accordance with an added feature of the invention, the transporter is formed with ribs defining the transport channels, a part of the ribs serving as centering ribs for centering the centrifugal filter on an entrainer secured to the motor shaft. It is noted that preferably only part of the ribs serve for centering the transporter on an entrainer secured to the motor shaft. A greater elasticity of the centering device is thereby attained, which permits higher manufacturing tolerances and thereby less costly manufacture.

In accordance with an additional feature of the invention, the transporter is formed with ribs defining the transport channels, the transporter being an upwardly widening hollow cone, on the inside of which the ribs extend. The ribs are preferably formed as projections from the inner wall of the hollow cone.

In accordance with yet another feature of the invention, the entrainer has a slightly conical frustroconical outer shell whereon the inner edges of the centering ribs lie. The inner edges are inclined with the same conicity as the outer wall of the entrainer to the middle axis.

In accordance with yet a further feature of the invention, each second rib is a centering rib.

In accordance with yet an added feature of the invention, the centrifugal filter is formed with a filtering ring slot on the outside thereof, the transporter having a transporting capacity coordinated with the filtering ring slot and filter geometry so that, when using ground coffee of at least one of fine and medium grinding grades, a brewing-water backwash occurs on the inside of the centrifugal filter in front of a layer of ground coffee formed therein. The filtering ring slot, for example, serves as the filter per se.

In this manner, during most of the time that the brewing water flows through the centrifugal filter, a uniformly distributed water ring is located therein and contains the ground coffee, and, also non-uniform distribution in the filter can no longer cause imbalance.

In accordance with yet an additional feature of the invention, the coordination is such that the centrifugal filter is completely filled with brewing water. The transporter thus has a considerably greater transport capacity than the centrifugal filter with a normal or conventional charge of ground coffee, so that the total transport depends only upon the filter per se i.e. the ring slot at the outer periphery of the centrifugal filter as well as the resistance of the layer of ground coffee. In this manner, assurance is provided that the ground coffee is always located in the brewing-water backwash.

In accordance with still another feature of the invention, the transporter has a delivery end which is closed up to at least one delivery opening, the delivery opening having a minimum inside width which is at most between substantially 1/100 to 50/100 mm. This prevents the grains or particles of ground coffee from returning through the discharge or delivery openings to the transporter, when the motor is switched off too soon, and from eventually entering the water bowl and dirtying it. The ground coffee closes the opening or openings and also prevents the coffee found in the coffee filter for the most part from flowing back into the transporter and into the water bowl.

In accordance with still a further feature of the invention, the minimum inside width of the at least one delivery opening is between substantially 1/100 and 30/100 mm and especially between 1/100 and 5/100 mm. The return flow, especially of ground coffee, is thereby prevented to the greatest extent.

In accordance with still an added feature of the invention, the centrifugal filter is formed with a ring slot extending around the rotational axis thereof and serving as a discharge opening. If the ring slot serving as discharge opening is formed between a transporter in the form of a hollow cone and a cover seated on the upper end of the hollow cone, the surface unevennesses of the parts are sufficient to maintain an adequate ring slot when the parts are fully placed against one another.

In accordance with concomitant features of the invention, the ring slot extending around the rotational axis of the centrifugal filter has a total cross section of such dimension as to effect a backwash of the brewing water in the transporter and, alternatively, when the coffee machine has a plurality of delivery openings formed therein, all of the delivery openings have a total cross section of such dimension as to effect a backwash of the brewing water in the transporter.

The backwash causes a uniform distribution to all openings and over the entire length of the ring slot, respectively, and thereby a uniform wetting of the ground coffee lying around the transporter in the centrifugal filter per se, which is especially important in the start-up phase.

Other features which are considered as characteristic for the invention are set forth in the appended claims.

Although the invention is illustrated and described herein as embodied in an electric coffee machine with a centrifugal filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
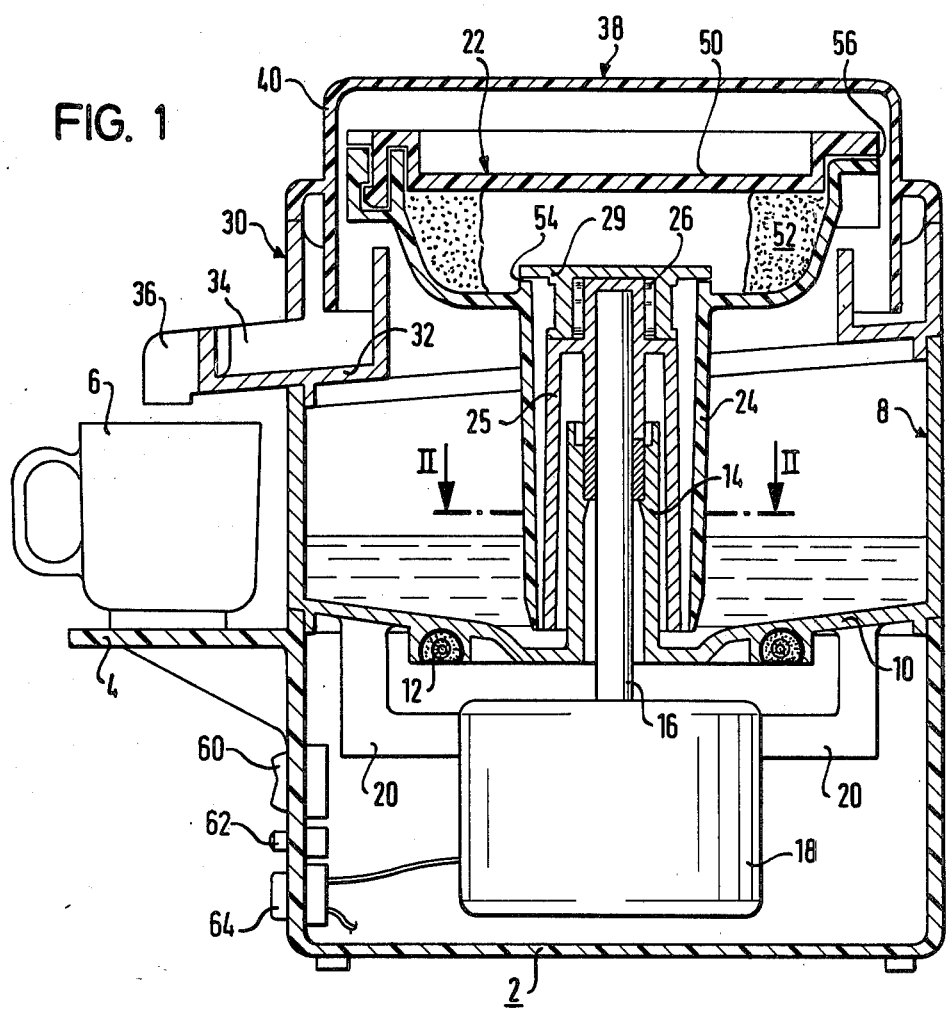
FIG. 1 is a vertical cross-sectional view taken substantially through a rotary shaft of a coffee machine with centrifugal filter constructed in accordance with the invention.

Referring now to the drawing and first, particularly, to FIG. 1 thereof, there is shown an electric coffee machine according to the invention having a pot-shaped casing 2 with a platform or base 4 for two coffee cups 6 built laterally thereon. On the socket casing 2, there rests a water bowl 8 with a bottom 10 which slopes downwardly towards the middle thereof, an electric heater 12 being disposed therebeneath. In the middle portion, the bottom 10 merges into a tube extension 14 projecting upwardly within the bowl 8 and through which a vertical shaft 16 of an electric motor 18 extends, the electric motor 18 being held by supports 20 formed on the underside of the bottom 10 of the waterbowl.

Figure 2:
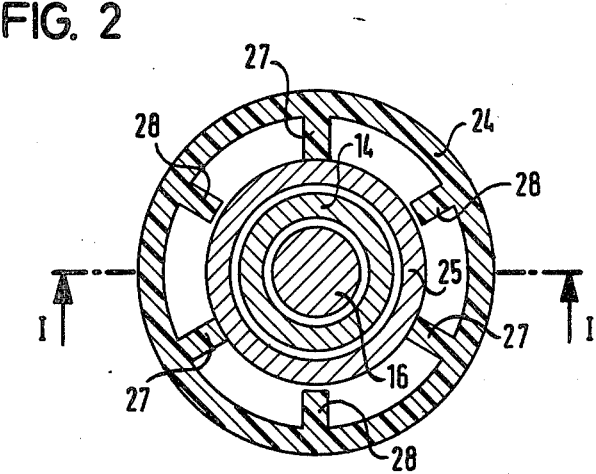
FIG. 2 is a cross-sectional view of FIG. 1 taken along the line II—II in direction of the arrows and FIG. 3 is an enlarged fragmentary view of FIG. 1 showing a modified feature thereof, namely the hollow cone with helical ribs.
Figure 3:
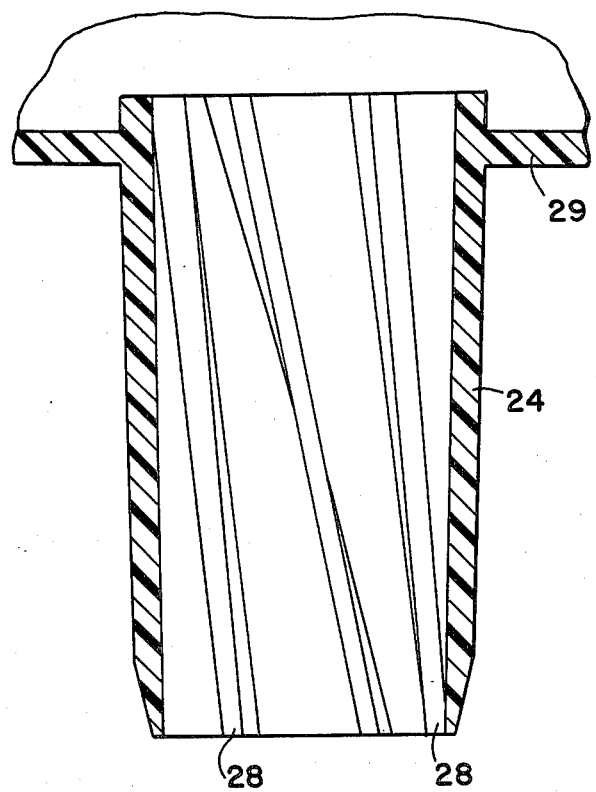

A centrifugal filter 22 has an upwardly widening hollow cone 24 which projects downwardly into the water bowl 8 and serves as transporter for the brewing water. On the motor shaft 16, an entrainer 25 is fastened against rotation relative thereto, the entrainer 25 extending, with a slightly conical downwardly widening outer shell over the tube extension 14 of the waterbowl 8, downwardly into the bottom region of the waterbowl. The hollow cone 24 has three centering ribs 27 (FIG. 2) protruding from the inner surface thereof and extending over the entire height thereof, the centering ribs 27 having inner edges having the same conicity relative to the rotary axis as does the outer shell of the entrainer 25 and being pressed onto this outer shell from above. Between each two centering ribs 27, a respective additional rib 28 is disposed, which does not extend all the way to the outer shell of the entrainer 25. The additional ribs 28, which do not serve for centering, serve to form or define a greater number of vertical channels in the hollow cone 24 in order to achieve the most uniform distribution possible of the boiling or brewing water supply around the circumference. The hollow cone 24 is closed above by a cover 29, a ring slot 54 remaining open between the hollow cone 24 and the cover for the delivery therethrough of the water to the ground coffee. The cover 29 is anchored to the ribs 27 and 28 so as to be fixed against relative rotation therewith and has a coupling gear at the inside thereof releasably meshing with a coupling 26 at the upper end of the entrainer 25 as shown in FIG. 3, the ribs 28 may be helical instead of rectilinear.

At the upper edge of the waterbowl 8, there is seated a collection chamber 30 in the form of a ring-shaped chute with a bottom 32 sloping towards the base or platform 4 for the coffee-cups 6 and a discharge channel 34 projecting somewhat radially outwardly which branches into two outlets or spouts 36 of which only one can be seen in the drawing. On the collection chamber 30, there rests a cover 38 with a downwardly extending cylindrical ring wall 40 which projects downwardly into the ring-shaped collection chamber 30 and collects the coffee flung out of the centrifugal filter and drains it off and into the ring chamber 30.

The operation of the coffee-machine is described hereinbelow:

When the cover 38 is removed and the centrifugal filter 22 is removed from the shaft 16, fresh water is poured from above into the waterbowl 8. Then, after the cover 50 of the centrifugal filter 22 has been removed, the ground coffee 52 is introduced into the filter 22. Then the centrifugal filter 22 is stuck onto the entrainer 24 and the coupling gear 26 thereof which is fastened on the shaft 16, and the cover 38 is replaced and two cups 6 are placed below the spouts 36 onto the base or platform 4. By actuating an on-off switch 60, the heater 12 is switched on. A non-illustrated temperature gauge, which is placed on the waterbowl 8, actuates a signal lamp 62 as soon as the brewing temperature has been reached. The machine is then in a ready state and the user can start the motor 18 as soon as he desires to drink the coffee by actuating the push-button switch 64. The centrifugal filter 22 is thereby accelerated, the coffee grains 52 as shown being initially distributed in ring-shaped fashion. As soon as a sufficient rotary speed is reached, the hollow cone 24 starts to transport and fling the brewing water through a ring slot 54 at the upper end thereof into the ground coffee ring 52. The prepared or brewed coffee discharges from the centrifugal filter 22 through a ring slot 56 and is collected by the ring wall and the collection wall 40, respectively, of the cover 38 and routed downwardly into the collection chamber 30, from which it flows through the channel 34, which has a distribution device disposed therewithin, through the spouts 36 and into the coffee cups 6. The sprayed-about coffee produces on the transparent ring wall and collection wall 40, respectively, a structure of coffee visible from the outside, which changes considerably, as soon as only little or no coffee is being flung or sprayed about. The user can then shut off the motor 18 again by releasing the push-button switch 64. The last flung or sprayed-about coffee requires another moment to travel along the ring wall 40, downwardly through the collection chamber 30, the channel 34, the distributor and the spouts 36 all the way into the coffee cups 6. The flinging or spraying operation takes about 35 to 40 seconds and the user, during this time, keeps the push-button switch 64 pressed down.

The horizontal ring slot 54, between the underside of the cover 29 and the upper edge of the hollow cone 24 which serves as transporter for the brewing water, has a slot width and inner width, respectively, of 3/100 mm. The ring slot is spaced from the bottom of the chamber receiving the ground coffee 52 a distance of about ⅓ of the height of this chamber.

The ring-slot 54 at the discharge or delivery end of the transporter and the entire transporter as well as the ring-slot 56 on the outside of the coffee filter 22 as well as the geometry of the filter and the resistance which results therefrom in the ground coffee layer located therein are so coordinated with one another that, when using ground coffee of fine or medium grind a brew water backwash is created at the ground coffee layer 52. During a great part of the brewing process, a brewing water ring is located within the ground coffee ring 52, i.e. as seen in radial direction in front of the ground coffee 52. A high extract content in the coffee i.e. a good utilization of the ground coffee, is thereby attained. A definition of the grinding grades of the ground coffee is provided in the German Published Prosecuted Application (DE-AS) No. 27 55 014, column 1, lines 47 to 55.

Preferably, the combination or adjustment of the foregoing inflow sizes with the charging of the filters with brewing water is such that the filter during the greatest part of the filtering process is totally filled with brewing water, and a backwash of the brewing water takes place all the way into the transporter and preferably up to the suction side thereof. The speed of transporting, in this case, is determined by the dimensions of the filter-slot 56 and the flow-through resistance of the ground coffee layer. The ring-slot 56 represents the actual filter.

The foregoing is a description corresponding to German application Nos. P 31 37 703.3, dated Sept. 22, 1981; G 81 27 734.2, dated Sept. 22, 1981 and P 32 04 255.8, dated Feb. 8, 1982, the International priority of which is being claimed in the instant application and which are hereby made part of this application. Any discrepancies between the foregoing specification and the aforementioned corresponding German applications are to be resolved in favor of the latter.

We claim:

1. Coffee machine comprising a centrifugal filter releasably coupled with a motor shaft during operation, said centrifugal filter having a ground-coffee receptacle and a substantially vertically disposed transporter extending downwardly from said ground-coffee receptacle and dipping into a water container for transporting water to said ground-coffee receptacle, said transporter being formed at a peripheral surface thereof with a plurality of ribs defining transport channels for transporting water from said water container to said ground-coffee receptacle, said ribs extending in a direction from said water container towards said ground-coffee receptacle; said centrifugal filter being formed with a filtering ring slot on the outside thereof, said transporter having a transporting capacity coordinated with said filtering ring slot and filter geometry so that, when using ground coffee of at least one of fine and medium grinding grades, a water backwash occurs on the inside of the centrifugal filter in front of a layer of ground coffee formed therein.

2. Coffee machine according to claim 1 wherein the coordination is such that said centrifugal filter is completely filled with water.

3. Coffee machine according to claim 1 wherein the transporter has a delivery end which is closed up to at least one delivery opening, said delivery opening having a minimum inside width which is at most between substantially 1/100 to 50/100 mm.

4. Coffee machine according to claim 3 wherein said minimum inside width of said at least one delivery opening is between substantially 1/100 and 30/100 mm and especially between 1/100 and 5/100 mm.

5. Coffee machine according to claim 1 wherein the centrifugal filter is formed with a ring slot extending around the rotational axis thereof and serving as a discharge opening.

6. Coffee machine according to claim 5 wherein said ring slot extending around the rotational axis of the centrifugal filter has a total cross section of such dimension as to effect a backwash of the water in the transporter.

7. Coffee machine comprising a centrifugal filter releasably coupled with a motor shaft during operation, said centrifugal filter having a ground-coffee receptacle and a substantially vertically disposed transporter extending downwardly from said ground-coffee receptacle and dipping into a water container for transporting water to said ground-coffee receptacle, said transporter being formed at a peripheral surface thereof with a plurality of ribs defining transport channels for transporting water from said water container to said ground-coffee receptacle, said ribs extending in a direction from said water container towards said ground-coffee receptacle; and a tubular container mounted on and rotatable with said motor shaft, a plurality of said ribs of said transporter being centering ribs for centering said centrifugal filter on said entrainer so that said centrifugal filter is entrained by said entrainer when rotated by said motor shaft.

8. Coffee machine according to claim 7 wherein said ribs extend substantially vertically at least in an upper part of the transporter.

9. Coffee machine according to claim 7 wherein said ribs extend substantially helically at least in an upper part of the transporter.

10. Coffee machine according to claim 7 wherein said ribs extend over substantially the entire height of the transporter.

11. Coffee machine according to claim 7 wherein said transporter is a hollow tube, on the inside of which said ribs extend.

12. Coffee machine according to claim 11, wherein said hollow tube of said transporter is formed as an upwardly widening hollow cone.

13. Coffee machine according to claim 7 wherein said entrainer has a slightly conical frustroconical outer shell whereon the inner edges of said centering ribs lie.

14. Coffee machine according to claim 7 wherein each second rib is a centering rib.

15. Coffee machine according to claim 7 wherein said centering ribs extend radially inwardly farther than others of said ribs.

16. Coffee machine according to claim 7 wherein said ribs are rectilinear.

17. Coffee machine according to claim 7 wherein said ribs are helical.

18. Coffee machine according to claim 7 including a plurality of delivery openings formed therein, all of said delivery openings having a total cross section of such dimension as to effect a backwash of the water in the transporter.

19. Coffee machine comprising a centrifugal filter having a transporting device connected thereto for rotation therewith, said transporting device extending into a water container located beneath said centrifugal filter for transporting water upwardly from said water container; said water container having a bottom through which a tubular extension projects upwardly in the interior of said water container; an electric motor disposed beneath said water container and having a drive shaft projecting upwardly through said tubular extension for driving said centrifugal filter; and an entrainer member for releasably coupling said centrifugal filter with said drive shaft during operation, said entrainer member being secured to an upper end portion of said drive shaft so as to be fixed agaist rotation relative to said drive shaft, said entrainer member being formed as a hollow cone having a downwardly widening outer shell extending downwardly over said tubular extension of said water container to a vicinity of said bottom of said water container.

20. Coffee machine according to claim 19 wherein said outer shell of said entrainer member is only slightly conically widened.

21. Coffee machine according to claim 19 wherein said transporting device is tubular and is formed with inwardly projecting ribs extending substantially vertically along the inner peripheral surface of said tubular transporting device, a plurality of said ribs being centering ribs and engaging, at the inner edge thereof, with said outer shell of said entrainer member.

* * * * *